(12) United States Patent
Beres et al.

(10) Patent No.: US 12,452,229 B2
(45) Date of Patent: Oct. 21, 2025

(54) ENTRY AUTHORIZATION SYSTEM AND METHOD THEREFOR

(71) Applicant: INTERQR LTD, Tel Aviv (IL)

(72) Inventors: Yuval Beres, Tel Aviv (IL); Ohad Drukman, Tel Mond (IL)

(73) Assignee: INTERQR LTD, Tel Aviv (IL)

( * ) Notice: Subject to any disclaimer, the term of this patent is extended or adjusted under 35 U.S.C. 154(b) by 29 days.

(21) Appl. No.: 18/682,382

(22) PCT Filed: Aug. 21, 2022

(86) PCT No.: PCT/IL2022/050913
§ 371 (c)(1),
(2) Date: Feb. 8, 2024

(87) PCT Pub. No.: WO2023/031909
PCT Pub. Date: Mar. 9, 2023

(65) Prior Publication Data
US 2024/0348594 A1    Oct. 17, 2024

(30) Foreign Application Priority Data

Sep. 3, 2021 (IL) .......................................... 286114

(51) Int. Cl.
*G07C 9/00* (2020.01)
*G07C 9/27* (2020.01)
*H04L 9/40* (2022.01)

(52) U.S. Cl.
CPC ...... *H04L 63/0807* (2013.01); *G07C 9/00571* (2013.01); *G07C 9/27* (2020.01); *H04L 63/1441* (2013.01); *G07C 2009/00476* (2013.01); *G07C 2209/08* (2013.01)

(58) Field of Classification Search
CPC .................. G07C 9/00571; G07C 9/27; G07C 2009/00476; G07C 2209/08; G07C 9/00896
See application file for complete search history.

(56) References Cited

U.S. PATENT DOCUMENTS

| | | |
|---|---|---|
| 10,157,512 B2 | 12/2018 | Simcik et al. |
| 10,460,221 B1 | 10/2019 | Tucker |
| 10,685,516 B1 | 6/2020 | Raduchel |
| 10,846,958 B2 | 11/2020 | Raduchel |
| 2014/0375422 A1* | 12/2014 | Huber ................ G07C 9/00571 340/5.61 |
| 2017/0289359 A1 | 10/2017 | Keller et al. |
| 2019/0342443 A1 | 11/2019 | Gerhardt et al. |

(Continued)

FOREIGN PATENT DOCUMENTS

| | | |
|---|---|---|
| CN | 103745151 A | 4/2014 |
| CN | 103955982 A | 7/2014 |

(Continued)

*Primary Examiner* — Nabil H Syed
(74) *Attorney, Agent, or Firm* — Bridgeway IP Law Group, PLLC; Hyun Woo Shin

(57) ABSTRACT

Internet-based entry authorization systems and methods for enabling a human authorizer to authorize or deny physical entry to a human visitor at a secure physical entry point designed to defend against replay attacks by use of instantaneously presented dynamic URLs including dynamic Physical Entry Request Identifiers (PERIs) requiring authentication.

8 Claims, 5 Drawing Sheets

(56) References Cited

U.S. PATENT DOCUMENTS

| | | |
|---|---|---|
| 2019/0387104 A1 | 12/2019 | Yssa et al. |
| 2020/0012245 A1* | 1/2020 | Marin Pulido |
| 2020/0302716 A1* | 9/2020 | Raduchel ............. H04M 11/025 |
| 2021/0358243 A1* | 11/2021 | De Rozairo ............ G06F 21/34 |
| 2022/0406112 A1* | 12/2022 | Calleberg ............. E05B 17/226 |
| 2023/0047608 A1* | 2/2023 | Trösch ............... G07C 9/00309 |

FOREIGN PATENT DOCUMENTS

| | | |
|---|---|---|
| CN | 105225314 A | 1/2016 |
| CN | 106204864 A | 12/2016 |
| CN | 106340103 A | 1/2017 |
| CN | 106355709 A | 1/2017 |
| CN | 107317797 A | 11/2017 |
| CN | 107393091 A | 11/2017 |
| CN | 206610360 U | 11/2017 |
| CN | 107547820 A | 1/2018 |
| CN | 107564143 A | 1/2018 |
| CN | 108010174 A | 5/2018 |
| CN | 108460262 A | 8/2018 |
| CN | 209232008 U | 8/2019 |
| CN | 110910544 A | 3/2020 |
| EP | 2592830 A1 | 5/2013 |
| EP | 3148169 B1 | 7/2018 |
| EP | 3382658 A1 | 10/2018 |
| JP | 2006-054591 A | 2/2006 |
| JP | 2020-167538 A | 10/2020 |
| TW | 201107577 A | 3/2011 |
| TW | 201417597 A | 5/2014 |
| TW | 201537521 A | 10/2015 |
| WO | 2018/198036 A1 | 11/2018 |
| WO | 2020/023448 A1 | 1/2020 |
| WO | 2020/198044 A1 | 10/2020 |

\* cited by examiner

ENTRY AUTHORIZATION SYSTEM AND METHOD THEREFOR

FIELD OF THE INVENTION

The invention relates to entry authorization systems and methods for authorizing or denying physical entry at secure physical entry points located at, for example, single home dwellings, condominiums, commercial properties, and the like.

BACKGROUND OF THE INVENTION

Some recently commercially available Internet-based entry authorization systems for authorizing or denying physical entry to secure physical entry points present a QR code for a human visitor using a visitor device to read the QR code for requesting physical entry thereat. The QR code graphically represents a standard format Universal Resource Locator (URL). Visitors are often one-time visitors, for example, a handyman, a deliveryman, and the like, and may only have a destination address without details of one or more human authorizers from whom they have to request physical entry at a secure physical entry point. Conversely, a visitor's identity is often unknown to a human authorizer whose authorization for physical entry at a secure physical entry point is required.

Such Internet-based entry authorization systems are based on the premise that human visitors possess an Internet-based visitor device having Connection-Oriented Live Communication (COLC functionality, a QR scanner for reading QR codes, and a browser for utilizing URLs. And also, Internet-based visitor devices are neither pre-loaded with an entry authorization dedicated application nor an entry authorization dedicated application is required to be installed at a secure physical entry point.

Human authorizers use an authorization device including COLC functionality for authorizing or denying physical entry requests with or without a live communication with a human visitor as per a human authorizer's decision. Human authorizers may be onsite or offsite. Authorization devices can be constituted by a smartphone with a dedicated access authorization application. Alternatively, authorization devices can be constituted by a personal computer with a browser for connecting to a dedicated web page.

Each secure physical entry point has a configurable, pre-set authorization entity configuration including a list of at least one human authorizer authorized to open a secure physical entry point. Each authorization entity configuration is also configured regarding the manner in which incoming physical entry requests are handled. Some authorization entity configurations automatically direct a physical entry request to one to more human authorizers. Other authorization entity configurations require a human visitor to navigate to and select one or more human authorizers. In such cases, the visitor devices are sent authorization entity configuration information for enabling one or more follow-up navigation requests after an initial physical entry request, for example, an initial selection of an apartment in a multi-apartment building. Some apartments may be single occupancy such that selecting an apartment automatically leads to a physical entry request being directed to its single occupant. Other apartments may be family occupancy such that selecting an apartment may require subsequent selection of a family member.

Secure physical entry points are prone to so-called replay attacks also known as play-back attacks which can be used to harass human authorizers and/or disrupt operation. Moreover, secure physical entry points are also prone to replay attacks for unauthorized intrusion.

There is a need to mitigate the negative effects of replay attacks.

SUMMARY OF THE INVENTION

Generally speaking, the present invention is directed at Internet-based entry authorization systems and methods for enabling a human authorizer to authorize or deny physical entry to a human visitor at a secure physical entry point. The present invention is based on the notion of defending against replay attacks by virtue of authentication of dynamic Physical Entry Request Identifiers (PERIs) constituting part of instantaneously presented dynamic URLs. Such PERI authentication necessarily imposes on a would-be human harasser that he, or possibly an accomplice on his behalf, has to be present at a secure physical entry point at an instance he intends to harass. Accordingly, it is envisaged that such a restriction will lead to a reduction in harassment of human authorizers.

Instantaneously presented dynamic URLs with dynamic PERIs implies they change over the course of time. The instantaneously presented dynamic URLs can be in the form of a so-called 2D code, a Near Field Communication (NFC) code, and the like. 2D codes are typically commonly employed (Quick Response) QR codes. Alternatively, other 2D codes can be employed including inter alia Aztec codes, Maxi codes, PDF417 codes, Semacodes, and the like.

The present invention can employ different types of update protocols for generating dynamic PERIs for inclusion in instantaneously presented dynamic URLs at a secure physical entry point depending on inter alia its nature, its configurable pre-set authorization entity configuration, expected number of human visitors, and the like. One suitable update protocol is a time-based protocol according to which dynamic PERIs are periodically updated, for example, each minute, each hour, and the like. Another suitable update protocol is an event-driven protocol according to which dynamic PERIs are updated in response to occurrences of events, for example, a dynamic PERI is changed at a secure physical entry point after each physical entry request therefrom. The present invention preferably manages instances that a human visitor genuinely scanned a URL but delayed in sending it whereby it was not authenticated.

In the case of authorization entity configurations requiring visitor navigation, the present invention can additionally defend against replay attacks by employing one or more navigation request authentication steps as follows: A navigation request timeout, namely, a human visitor is required to send a navigation request within a certain duration after sending an originating physical entry request. Each authenticated physical entry request is limited to a single visitor navigation. Ensuring the visitor device sending a navigation request is the same visitor device that sent an originating physical entry request. The use of a navigation request token, for example, a server sends a navigation request token along with authorization entity configuration information to a visitor device from which originated a physical entry request and a visitor device has to return the same navigation request token upon a navigation request. The validity of the navigation request token may be limited to a predetermined duration.

BRIEF DESCRIPTION OF THE DRAWINGS

In order to understand the present invention and to see how it can be carried out in practice, preferred embodiments will now be described, by way of non-limiting examples only, with reference to the accompanying drawings, in which similar parts are likewise numbered, and in which.

DETAILED DESCRIPTION OF THE DRAWINGS

Uniform Resource Locators (URLs)

URLs conform to the syntax of a generic Uniform Resource Identifier (URI). The URI generic syntax consists of a hierarchical sequence of five components URI=scheme: [//authority] path [?query] [#fragment]
where the authority component divides into three sub-components:
authority=[userinfo@] host [:port]
userinfo=user [:password]

URLs can be unique by virtue of a change in one or more of their five components and/or in one or more of their three authority subcomponents.

Four unique URLs by virtue of their path are:
https://example.com/152810456
https://example.com/hf3287hbs
https://example.com/5609gew5e
https://example.com/9365f6017

Figure 1:
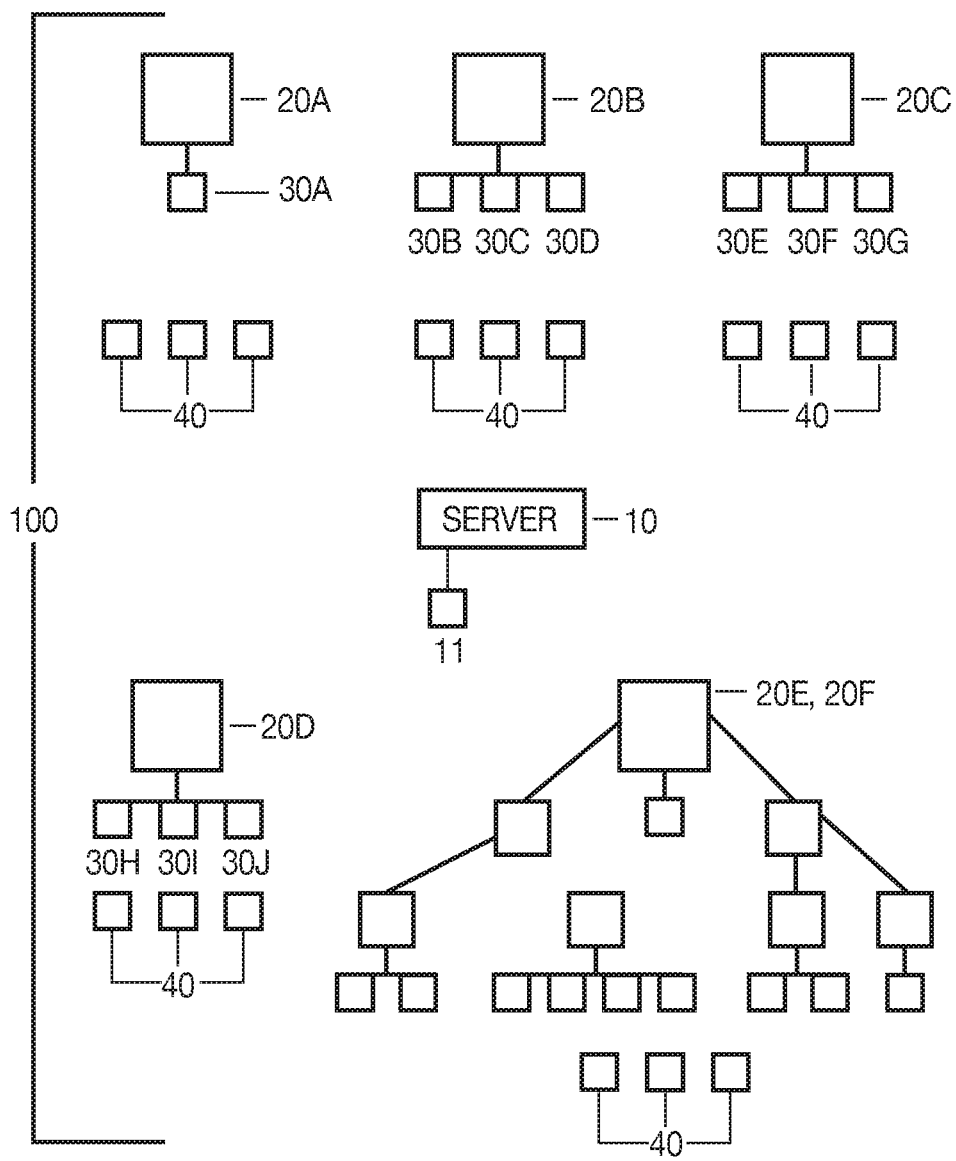
FIG. 1 is a block diagram of a conventional Internet-based entry authorization system including a server and six secure physical entry points for authorizing or denying a physical entry request at a secure physical entry point.

Four unique URLs by virtue of their sub-domain are:
https://q3f42ch7f.example.com
https://503525469.example.com
https://6315tq31f.example.com
https://12as79009.example.com Conventional Internet-Based Entry Authorization System FIG. 1 shows a conventional Internet-based Entry Authorization System (EAS) 100 including a server 10, a multitude of Secure Physical Entry Points (SPEPs) 20 and a plurality of Internet-based authorization devices 30. The EAS includes an Internet-accessible authorization entity configuration structure for storing a configurable, pre-set authorization entity configuration for each SPEP 20, namely, the one or more authorization devices 30 configured for opening each SPEP 20. The server 10 preferably includes the authorization entity configuration structure 11. The server 10 receives physical entry requests from visitor devices 40 for initiating an entry authorization protocol. Each entry authorization protocol terminates in one of two states: Either authorizing or denying physical entry requests at a SPEP 20.

Figure 2:
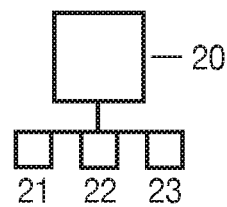
FIG. 2 is a block diagram of a FIG. 1 secure physical entry point.

FIG. 2 shows each SPEP 20 includes an Internet-based relay 21, an electrically-operated lock 22 which can be opened by the relay 21, and a sign 23 for displaying a unique static QR code. The sign 23 is preferably non-electronic, for example, its static QR code is printed in durable ink. A suitable Internet-based relay 21 includes, for example, Pal Gate SG34-4GI-L commercially available from PAL Electronics Systems www.pal-es.com.

The static QR codes each represent a unique static URL which enables the server 10 to identify a specific SPEP 20. Each static URL includes a unique Entry Point Identifier (EPI). The URLs conform to the syntax of a generic Uniform Resource Identifier (URI) as described hereinabove. The SPEPs 20 typically share the same host name for facilitating set-up and maintenance of the server 10.

Figure 3:
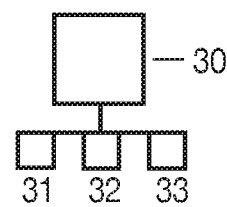
FIG. 3 is a block diagram of a FIG. 1 authorization device.
Figure 4:
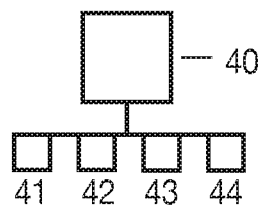
FIG. 4 is a block diagram of a FIG. 1 visitor device.

FIG. 3 shows each authorization device 30 has an installed entry authorization dedicated application 31. Each authorization device 30 has an authorization device identifier 32. Each authorization device 30 includes COLC functionality 33 for receiving COLC requests from the server 10 to establish a COLC session with a visitor device 40. A COLC request alerts a human authorizer regarding an incoming physical entry request. The alert may be in the form of ringing, vibrating, flashing, and the like. A single human authorizer may have more than one authorization devices. A human authorizer employs his authorization device 30 to respond to a COLC request in one of three ways:

Response 1: Authorize physical entry at a SPEP, thereby automatically terminating an entry authorization protocol Response 2: Accept an incoming COLC request to initiate a COLC for communicating with a human visitor for deciding whether to authorize or deny physical entry at a SPEP Response 3: Deny physical entry at a SPEP, thereby automatically terminating an entry authorization protocol FIG. 4 shows each visitor device 40 includes a user interface 41, COLC functionality 42 for holding a live communication, a QR reader 43 for reading QR codes and a browser 44 for launching URLs. The visitor devices 40 are either a smartphone or a tablet. Human visitors are not required to install an entry authorization dedicated application on their visitor devices 40 for requesting physical entry at a SPEP.

EAS 100 includes six SPEPs 20A-20F which differ in terms of their configurable, pre-set authorization entity configurations. Authorization entity configurations can be classified into one of two types: Not requiring visitor navigation and conversely requiring visitor navigation. A human visitor does not need to be aware of a SPEP's authorization entity configuration which does not require visitor navigation. A human visitor becomes at least partially aware of a SPEP's authorization entity configuration requiring visitor navigation such that he can make at least one visitor navigation decision. The server 10 necessarily has to send authorization entity configuration information to a visitor device for SPEPs requiring visitor navigation.

SPEPs not Requiring Visitor Navigation

There are three types of authorization entity configurations not requiring visitor navigation as follows:

A Type 1 authorization entity configuration implemented, for example, by SPEP 20A, in which a single authorization device 30A is configured for authorizing or denying physical entry thereat.

A Type 2 authorization entity configuration implemented, for example, by SPEP 20B, which can be opened by each authorization device of a configurable pre-set sequence of at least two authorization devices, for example, authorization devices 30B-30D. The server 10 initially sends an incoming physical entry request to the authorization device 30B for a predetermined time. If the authorization device 30B does not respond to same, the server 10 sends the incoming physical entry request to the authorization device 30C for a predetermined time. If the authorization device 30C does not respond to same, the server 10 sends the incoming physical entry request to the authorization device 30D for a predetermined time.

A Type 3 authorization entity configuration implemented, for example, by SPEP 20C, which can be opened by each authorization device of at least two authorization devices, for example, authorization devices 30E-30G, which are simultaneously polled by the server 10. The server 10 selects the first authorization device that responds to an incoming physical entry request as the authorization device for selectively authorizing or denying physical entry to a SPEP.

SPEPs Requiring Visitor Navigation

Authorization entity configurations which require visitor navigation take the form of a hierarchical tree of at least two branches with each branch having at least one human authorizer at the leaf of the branch. A human visitor has to make at least one visitor navigation for sending a physical entry request at a SPEP. The server 10 necessarily has to send a SPEP's authorization entity configuration to each human visitor's visitor device requesting physical entry thereat.

A Type 4 authorization entity configuration is implemented, for example, by SPEP 20D taking the form of a hierarchical tree having three branches, each branch having a single human authorizer for authorizing or denying physical entry thereat. The SPEP 20D can be opened by each authorization device of three authorization devices 30H-30J.

The SPEP 20E is an exemplary SPEP having a complicated authorization entity configuration. Each branch implements a Type 1 or Type 2 or Type 3 or Type 4 authorization entity configuration. Each branch can have one or more sub-branches each implementing a Type 1 or Type 2 or Type 3 or Type 4 authorization entity configuration.

A physical installation can have multiple SPEPs having the same or different authorization entity configurations. For example, FIG. 1 shows an additional SPEP 20F having the same authorization entity configuration as SPEP 20E.

Figure 5:
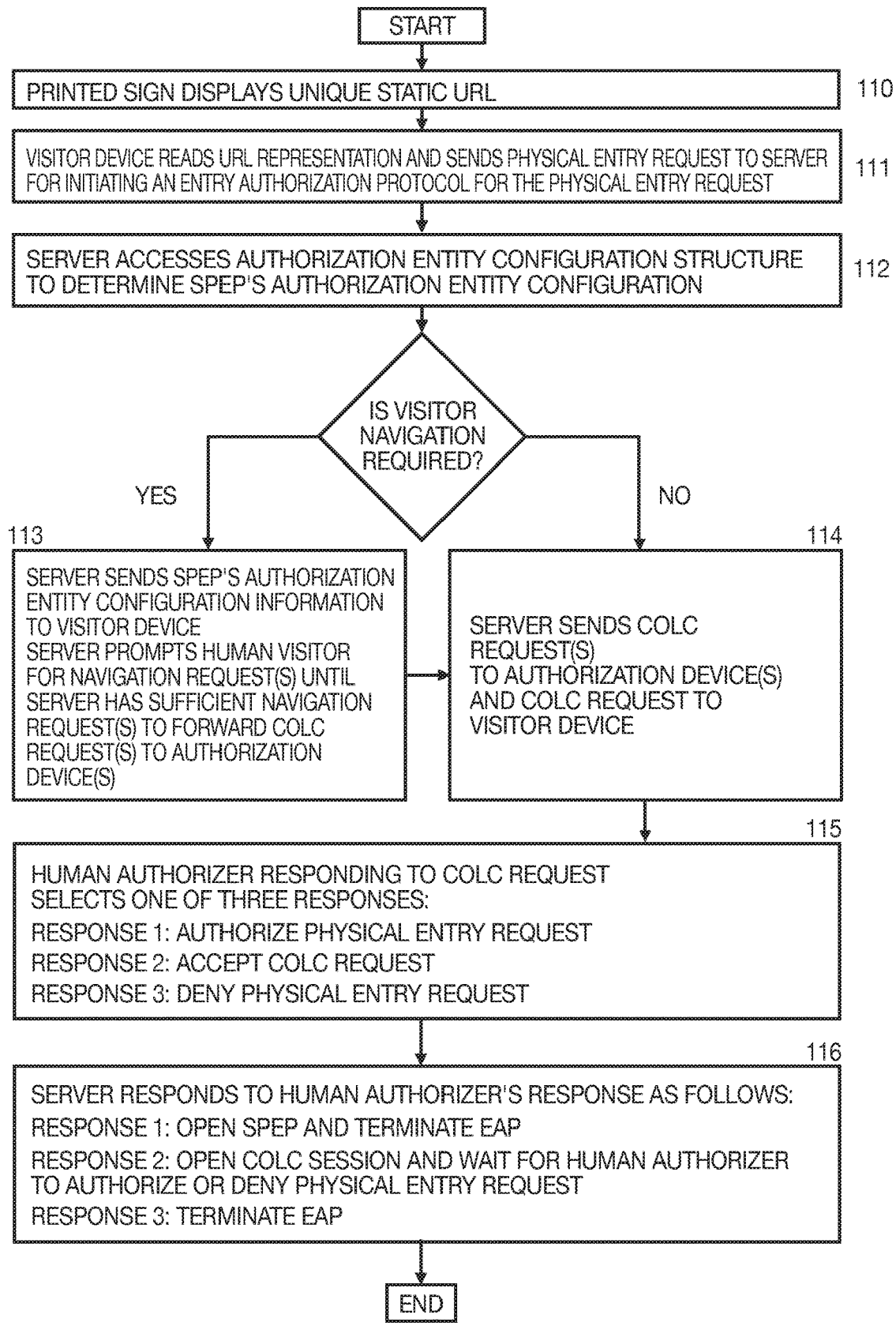
FIG. 5 is a flow diagram of operation of the FIG. 1 entry authorization system.

EAS 100 operation for authorizing or denying physical entry at a SPEP is now described with reference to FIG. 5 as follows:

Step 110: The printed sign displays a unique static QR code representing a unique static URL.

Step 111: A human visitor arrives at the SPEP and employs his visitor device to read the URL representation to send a physical entry request to the server for initiating an entry authorization protocol for the physical entry request.

Step 112: The server accesses the authorization entity configuration structure to determine the SPEP's authorization entity configuration and whether visitor navigation is required.

Step 113: If the SPEP does require visitor navigation, the server sends the SPEP's authorization entity configuration information to the visitor device. The server prompts the human visitor for navigation requests until the server has sufficient navigation requests to forward a COLC request to one or more authorization devices. The server might require multiple navigation requests from a human visitor before having sufficient navigation requests to forward a COLC request to one or more selected authorization devices.

Step 114: If the SPEP does not require visitor navigation or after the server has received sufficient navigation requests, the server sends a COLC request to one or more authorization devices and a COLC request to the visitor device.

Step 115: A human authorizer responding to the COLC request employs his authorization device to select one of three responses:

Response 1: Authorize physical entry request
Response 2: Accept the COLC request
Response 3: Reject the COLC request and thereby deny a physical entry request Step 116: The server responds to human authorizer's response as follows:

Response 1: Instructs the relay to open the SPEP and terminates the COLC requests at both the one or more authorization devices and the visitor device, thereby terminating the entry authorization protocol.

Response 2: Opens a COLC session and waits for a human authorizer to either authorize or deny the physical entry request. In case of a denied physical entry request, the server terminates the COLC requests at both the one or more authorization devices and the visitor device, thereby terminating the entry authorization protocol. In case a human authorizer authorizes the physical entry request, the server instructs the relay to open the SPEP and thereby granting physical entry to the human visitor. COLC sessions may stay open for a predetermined time for enabling continuing communication between a human authorizer and a human visitor. Either the human authorizer or the human visitor can terminate the COLC session, thereby terminating the entry authorization protocol.

Response 3: Terminates the COLC requests at both the one or more authorization devices and the visitor device, thereby terminating the entry authorization protocol.

Replay Attack Safe Internet-Based Entry Authorization System

Figure 6:
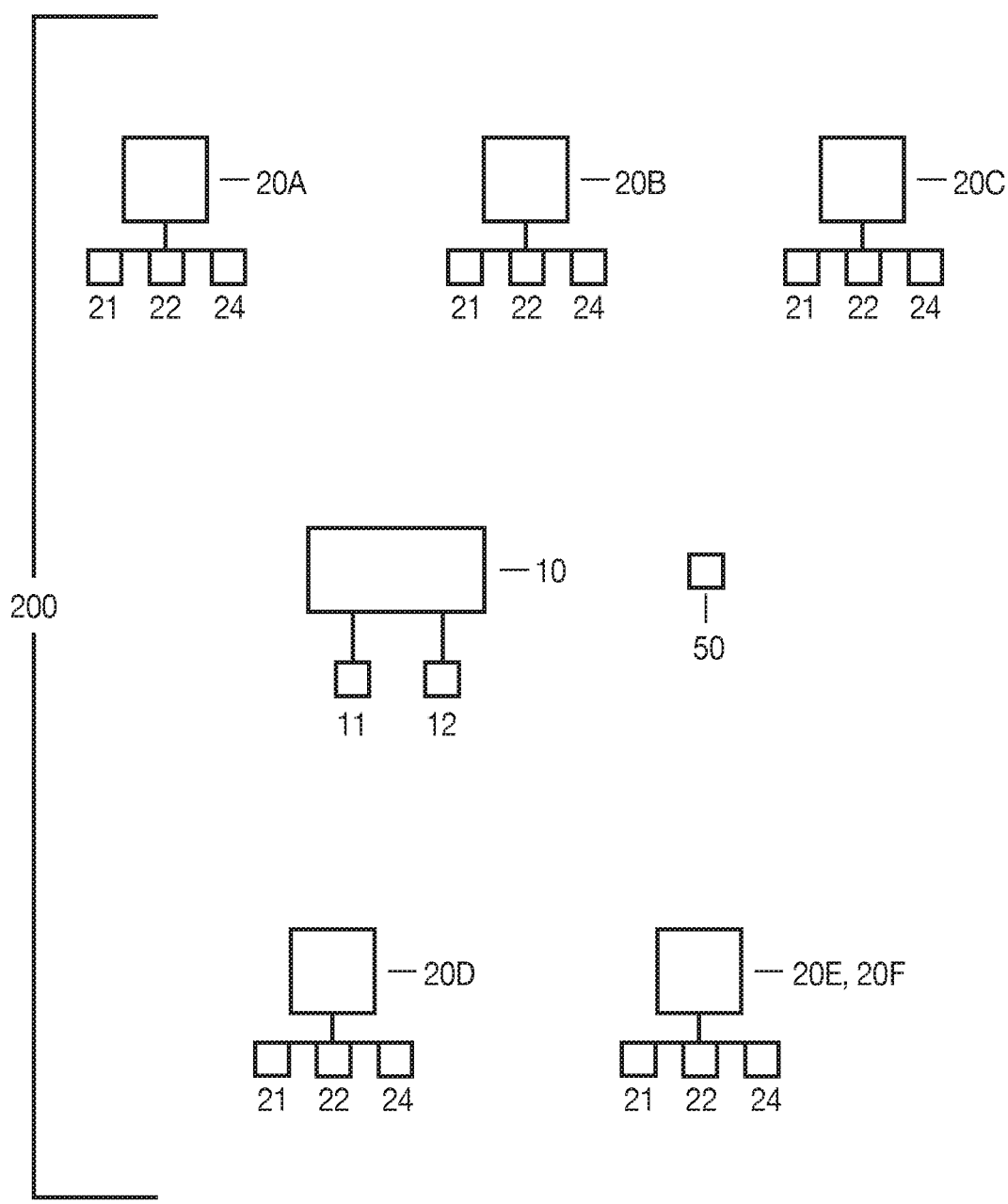
FIG. 6 is a block diagram of a Replay Attack Safe Internet-based entry authorization system including a server, six secure physical entry points and dynamic URL generating functionality for generating dynamic URLs in accordance with the present invention.

FIG. 6 shows an Internet-based Entry Authorization System (EAS) 200 for providing replay attack protection by imposing on a would-be human harasser that he, or possibly an accomplice on his behalf, has to be present at a secure physical entry point at an instance he intends to harass.

The EAS 200 has a similar construction and operation as the EAS 100 and therefore similar parts are likewise numbered. The EAS 200 differs from the EAS 100 as follows: The EAS 200 has dynamic URL generating functionality 50 for generating dynamic URLs presented at the SPEPs 20. The EAS 200 can use either offline URL generation method or online URL generation method for each SPEP 20. Each dynamic URL includes a dynamic Physical Entry Request Identifier (PERI).

Each SPEP 20 has an electronic URL presentation device 24 for presenting dynamic URLs. The electronic URL presentation device 24 replaces the display stand 23. The electronic URL presentation device 24 requires a power source, for example, mains, battery, and the like. The electronic URL presentation device 24 can be a screen display for displaying 2D codes representing URLs, an NFC transmitter for transmitting URLs, and the like.

The server 10 has authentication functionality 12 for authenticating physical entry requests to the SPEPs 20A-20F and, depending on their respective authorization entity configurations, navigation requests. Alternatively, the authentication functionality 12 can be provided as a discrete component.

Each SPEP's electronic URL presentation device 24 is synchronized with the server 10 in either offline mode or online mode, namely, the server 10 is correspondingly not connected or connected through the internet with an electronic URL presentation device 24. Offline mode is presently preferred as described hereinbelow. Offline or online synchronization between the server 10 and an electronic URL presentation device 24 determines the nature of dynamic URL generation and identification at each SPEP 20.

EAS 200 can simultaneously support offline and online electronic URL presentation devices 24 at different SPEPs. The server 10 handles scanned dynamic URLs from an offline electronic URL presentation device differently than from an online electronic URL presentation device. Accordingly, dynamic URLs can be flagged to indicate whether its originating SPEP has an offline electronic URL presentation device or an online electronic URL presentation device. Alternatively, the server 10 has a default setting that dynamic URLs are received from offline electronic URL presentation device 24. In the case the server 10 fails to process a dynamic URL based on its default setting, the server processes the dynamic URL based on the SPEP 20 having an online electronic URL presentation device 24.

EAS 200 operation includes determining a policy for each SPEP 20 regarding whether only a present URL can be authenticated or one or more previous URLs can also be authenticated to overcome instances that a human visitor genuinely scanned a URL but delayed in sending it whereby it was not authenticated.

Offline Electronic URL Presentation Devices

Offline electronic URL presentation devices 24 independently generate unique dynamic URLs. The unique dynamic URLs necessarily include an EPI and a PERI. An EPI and a PERI can be placed in any URI field as described hereinabove.

Dynamic URLs can include an EPI in a wide range of techniques including inter alia:

Technique 1: A separate EPI field for containing a static EPI. Four unique dynamic URLs which contain both a dynamic PERI and a static EPI, for example 89345, are as follows:

https://example.com/152810456/89345
https://example.com/hf3287hbs/89345
https://example.com/5609gew5e/89345
https://example.com/9365f6017/89345

In this technique, EPI identification involves parsing to the known field.

Technique 2: A separate EPI field for containing a dynamic EPI for enabling each SPEP to be represented by different EPIs from a predetermined bank of EPIs each configured to indicate the same SPEP 20. Four unique dynamic URLs which contain both a dynamic PERI and a dynamic EPI are as follows:

https://example.com/152810456/ab89345
https://example.com/hf3287hbs/12345cf
https://example.com/5609gew5e/56ft784
https://example.com/9365f6017/23245

In this technique, EPI identification involves parsing to the known field.

Technique 3. Encode an EPI together with a PERI into a single string. Four dynamic URLs which contain a PERI only and from which an EPI can be deduced therefrom at the server are as follows:

https://example.com/1521287q6
https://example.com/hf3g87has
https://example.com/aj09gew7e
https://example.com/gyh4f6sg2

Suitable methods for deducing an EPI from a PERI can include, but are not limited, to:
1. Encoding/embedding an EPI within a PERI and later decoding/parsing it.
2. Checking a PERI's format, and deducing its originating SPEP's EPI.

PERIs can be generated in a wide range of techniques including inter alia:

Mode A: The server 10 and an electronic URL presentation device 24 possess an identical, pre-shared secret key. The electronic URL presentation device 24 continuously generates dynamic PERIs. The server 10 has the ability to generate on demand, for example, on receipt of a physical entry request, the same dynamic PERI as the electronic URL presentation device 24 at an instant in time. The server 10 authenticates received dynamic PERIs based on its knowledge of correct dynamic PERIs.

Mode B: The server 10 and an electronic URL presentation device 24 possess an identical, pre-shared secret key. The electronic URL presentation device 24 continuously generates dynamic PERIs. The server 10 authenticates a dynamic PERI by way of digital signature signing. The server 10 checks received dynamic PERIs were signed with the same secret key it possesses.

Mode C: The server 10 and an electronic URL presentation device 24 have pre-loaded lists of dynamic PERIs. The server 10's list of dynamic PERIs includes electronic URL presentation device 24's list of dynamic PERIs. The server 10 authenticates that its list of dynamic PERIs includes a received dynamic PERI or that it has not been used in the past.

Mode D: An electronic URL presentation device 24 includes a pre-loaded list of dynamic PERIs which were digitally signed by the server 10 using a secret key. The server 10 authenticates a received dynamic PERI by verifying its digital signature with the secret key associated with the SPEP.

Online Electronic URL Presentation Devices

Online electronic URL presentation devices can generate unique dynamic URLs in the same manner as offline electronic URL presentation devices. However, because of its nature, dynamic URL generation can be significantly simplified by way of generation of random dynamic PERIs either at the server or at an online electronic URL presentation device 24. There are many ways of random number/string generation, for example, a linear congruential generator, a Mersenne Twister algorithm, etc. Dynamic URLs can be generated in situ or read from a memory device preloaded with dynamic URLs. Also, dynamic URLs are transmitted between the server 10 and an online electronic URL presentation device 24 either by push or fetch operations. The server 10 stores a list of SPEPs 20 and their present dynamic URLs and preferably their previous dynamic URLs. Each dynamic URL is considered a dynamic Physical Entry Request Identifier (PERI). The server 10 identifies a SPEP 20 from a dynamic URL received with a physical entry request by searching for the URL among all the stored present and preferably one or two before present URLs. Identifying a SPEP 20 implies that a PERI received with a physical entry request is authenticated.

EAS Operation

EAS 200 operation is similar to EAS 100 operation and additionally includes a common PERI authentication step for SPEPs not requiring and requiring visitor navigation. SPEPs requiring visitor navigation can preferably require navigation request authentication steps. The entry authorization protocol described hereinabove can be modified to include dynamic PERI authentication and navigation request authentication. Alternatively, dynamic PERI authentication and navigation request authentication can be considered an independent protocol before the entry authorization protocol described hereinabove.

Figure 7:
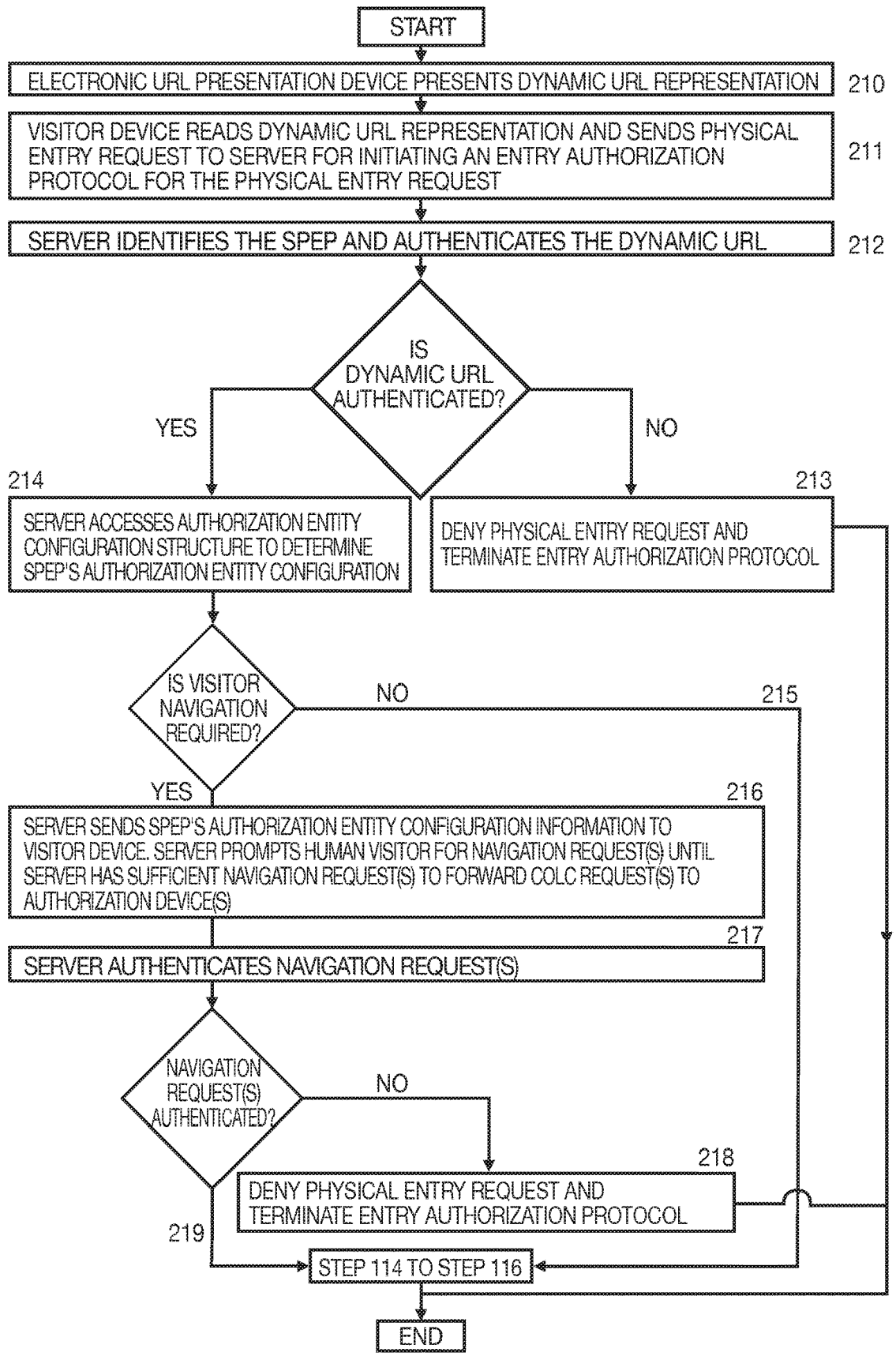
FIG. 7 is a flow diagram of operation of the FIG. 6 entry authorization system.

EAS 200 operation for authorizing or denying physical entry at a SPEP is now described with reference to FIG. 7 as follows:

Step 210: The electronic URL presentation device presents a dynamic URI.

Step 211: A human visitor arrives at the SPEP and employs his visitor device to read an instantaneously presented dynamic URL representation to send a physical entry request to the server for initiating an entry authorization protocol for the physical entry request.

Step 212: The server identifies a SPEP and employs its authentication functionality for authenticating the dynamic URL as described hereinabove.

Step 213: If the dynamic URL is not authenticated, the server denies the physical entry request and terminates the entry authorization protocol.

Step 214: If the dynamic URL is authenticated, the server accesses the authorization entity configuration structure to determine whether the SPEP requires visitor navigation or not.

Step 215: If the SPEP does not require visitor navigation, EAS operation continues according to Step 114 to Step 116 for authorizing or denying physical entry at the SPEP.

Step 216: If the SPEP does require visitor navigation, the server sends the SPEP's authorization entity configuration information to the visitor device. The server prompts the human visitor for navigation requests until the server has sufficient navigation requests to forward a COLC request to one or more selected authorization devices. The server might require multiple navigation requests from a human visitor before having sufficient navigation requests to forward a COLC request to one or more selected authorization devices.

Step 217: The server executes one or more navigation request authentication steps before continuing to send a COLC request to one or more selected authorization devices. The one or more navigation request authentication steps include inter alia:

Step 217A: The server calculates the time interval between an arrival time of a navigation request and an arrival time of an authenticated physical entry request, and, on the condition the time interval satisfies a predetermined duration, the server authenticates the navigation request. The server can further limit an authenticated physical entry request to a single visitor navigation.

Step 217B: In the case of a visitor device including at least one visitor device identifier, the server stores a visitor device's at least one visitor device identifier on receipt of a physical entry request and, on the condition the same visitor device sends both the authenticated physical entry request and a navigation request, the server authenticates the navigation request. Visitor device identifiers can be based on a device fingerprint, a hardware identifier, and the like.

Step 217C: The server generates a navigation request token and includes the navigation request token with the authorization entity configuration information to the visitor device originating the physical entry request. The server can employ conventional techniques for including a navigation request token, namely, within a cookie, placing the navigation token in a HTTP header, placing a navigation token in a HTTP body, utilizing custom HTTP status codes, utilizing web-socket communication, utilizing HTTP session protocol, as part of a URL, utilizing http/2 stream, utilizing XMPP, utilizing IRC, utilizing web-push notification, and the like. The visitor device returns the navigation request token with its navigation request and the server authenticates the navigation request on the condition the received navigation request token is valid. A navigation request token is valid on satisfying at least the navigation request token has not expired beyond a predetermined validity period. Further conditions for validating a navigation request token can include:

1. The navigation request token is associated with the SPEP for which physical entry is being requested.
2. The navigation request token has been generated at the server.
3. The navigation request token has been digitally signed by the server.
4. The navigation request token is originating from a previously authenticated URL for the same SPEP.
5. The navigation request token is originating from a previously authenticated URL for the SPEP, which has been issued by the same visitor device who is sending the navigation request token.
6. The navigation request token has not been used in the past to the point of either an authorized or denied physical entry request.

Step 218: If a navigation request(s) is not authenticated, the server denies a physical entry request and terminates an entry authorization protocol.

Step 219: If a navigation request(s) is authenticated, EAS 200 operation continues according to Step 114 to Step 116 for authorizing or denying physical entry at the SPEP.

While the invention has been described with respect to a limited number of embodiments, it will be appreciated that many variations, modifications, and other applications of the invention can be made within the scope of the appended claims.

The invention claimed is:

1. An Internet-based entry authorization system for authorizing or denying physical entry to a human visitor at a secure physical entry point of a multitude of secure physical entry points, each human visitor possessing an Internet-based visitor device having Connection-Oriented Live Communication (COLC) functionality, a reading capability for reading a URL representation and a browser, each visitor device being operative without an installed entry authorization dedicated application, the system comprising:

(a) a plurality of secure physical entry points, each secure physical entry point having:
  i) an electronic URL presentation device for presenting dynamic URLs, each dynamic URL representing at least a dynamic physical entry request identifier, and
  ii) an Internet-based relay operated electrical lock;

(b) a plurality of Internet-based authorization devices, each authorization device configured for authorizing or denying opening at least one electrical lock, each authorization device having COLC functionality for selective communication with a visitor device;

(c) an Internet-accessible authorization entity configuration structure for storing an authorization entity configuration information regarding authorized opening at each secure physical entry point; and (d) an Internet-based server for communicating with the plurality of Internet-based relay operated electrical locks, the plurality of authorization devices, the plurality of visitor devices, and the authorization entity configuration structure such that the Internet-based entry authorization system is operative to execute the following steps:

(a) the multitude of electronic URL presentation devices each independently presenting a dynamic URL, each dynamic URL including at least a dynamic physical entry request identifier,
(b) the server receiving a physical entry request from a human visitor's visitor device requesting physical entry to a secure physical entry point, the physical entry request including at least an instantaneously presented dynamic physical entry request identifier, and
(c) the server authenticating the physical entry request's dynamic physical entry request identifier whereupon the server either on, the physical entry request being authenticated, enabling a human authorizer employing an authorization device to authorize or deny physical entry to the human visitor at the secure physical entry point or, the physical entry request not being authenticated, not enabling physical entry to the human visitor at the secure physical entry point,
   wherein subsequent to the physical entry request being authenticated, visitor navigation being required to select an authorization entity for opening the secure physical entry point, the Internet-based entry authorization system being configured to execute further steps of:
(d) the server sending the secure physical entry point's authorization entity configuration information to the visitor device for enabling the human visitor to select an authorization entity to send his physical entry request to, the authorization entity configuration information including a unique authorization entity identifier for each authorization entity;
(e) the server receiving a navigation request from human visitor's visitor device, the navigation request including the authorization entity identifier of the human visitor's selected authorization entity; and
(f) the server executing a navigation request authentication step for authenticating the navigation request before continuing to send a COLC request to each selected authorization entity and, in an event of a non-authenticated navigation request, not enabling physical entry to the human visitor at the secure physical entry point,
   wherein the Internet-based entry authorization system being configured to execute further steps of:
   the server generating a navigation request token;
   the server including the navigation request token with the authorization entity configuration information to the visitor device originating the physical entry request;
   the visitor device returning the navigation request token with the navigation request; and
   the server authenticating the navigation request when the received navigation request token is valid, otherwise not authenticating the navigation request,
   the received navigation request token being valid on satisfying at least the navigation token has not expired beyond a predetermined validity period.

2. The system according to claim 1, wherein the server executing the further steps of:
   calculating a time interval between an arrival time of the navigation request and an arrival time of the originating physical entry request, and
   authenticating the navigation request when the time interval satisfies a predetermined duration, otherwise not authenticating the navigation request.

3. The system according to claim 2, wherein the server executing the further step of limiting a single visitor navigation to one or more authorization devices per authenticated physical entry request.

4. The system according to claim 1, wherein the visitor device includes at least one visitor device identifier, and each physical entry request originating therefrom includes at least one visitor device identifier, and the server executing the further the steps of:
   storing the at least one visitor device identifier of the visitor device on receipt of the physical entry request; and
   authenticating the navigation request when the same visitor device sent the authenticated physical entry request and the navigation request, otherwise not authenticating the navigation request.

5. An Internet-based entry authorization method for authorizing or denying physical entry to a human visitor at a secure physical entry point,
   each human visitor possessing an Internet-based visitor device having Connection-Oriented Live Communication (COLC) functionality, a reading capability for reading an URL representation and a browser,
   each visitor device being operative without an installed entry authorization dedicated application,
   the method comprising the steps of:
(a) providing a multitude of secure physical entry points, each secure physical entry point having:
   i) an electronic URL presentation device for presenting dynamic URLs, each dynamic URL representing at least a dynamic physical entry request identifier, and ii) an Internet-based relay operated electrical lock;
(b) providing a plurality of Internet-based authorization devices, each authorization device configured for authorizing or denying opening at least one electrical lock, each authorization device having COLC functionality for selective communication with a visitor device;
(c) providing an Internet-accessible authorization entity configuration structure for storing authorization entity configuration information regarding authorized opening at each secure physical entry point;
(d) providing an Internet-based server for communicating with the multitude of Internet-based relay operated electrical locks, the plurality of authorization devices, the plurality of visitor devices, and the authorization entity configuration structure;
(e) the multitude of electronic URL presentation devices each independently presenting a dynamic URL, each dynamic URL including at least a dynamic physical entry request identifier;
(f) the server receiving a physical entry request from a human visitor's visitor device requesting physical entry to a secure physical entry point, the physical entry request including at least an instantaneously presented dynamic physical entry request identifier; and
(g) the server authenticating the physical entry request's instantaneously presented dynamic physical entry request identifier whereupon the server either on, the physical entry request being authenticated, enabling a human authorizer employing an authorization device to authorize or deny physical entry to the human visitor at the secure physical entry point or, the physical entry request not being authenticated, not enabling physical entry to the human visitor at the secure physical entry point,
   wherein subsequent to the physical entry request being authenticated, visitor navigation being required to select an authorization entity for opening the secure physical entry point, the method including the further steps of:
(h) the server sending secure physical entry point's authorization entity configuration information to the visitor device for enabling the human visitor to select an authorization entity to send his physical entry request to, the authorization entity configuration information including a unique authorization entity identifier for each authorization entity;

(i) the server receiving a navigation request from the human visitor's visitor device, the navigation request including the authorization entity identifier of the human visitor's selected authorization entity; and (j) the server executing a navigation request authentication step for authenticating a navigation request before continuing to send a COLC request to each selected authorization entity and, in an event of a non-authenticated navigation request, not enabling physical entry to the human visitor at the secure physical entry point, wherein the Internet-based entry authorization method comprising further steps of:

the server generating a navigation request token;

the server including the navigation request token with the authorization entity configuration information to the visitor device originating the physical entry request;

the visitor device returning the navigation request token with the navigation request; and the server authenticating the navigation request when the received navigation request token is valid, otherwise not authenticating the navigation request, the received navigation request token being valid on satisfying at least the navigation token has not expired beyond a predetermined validity period.

6. The method according to claim 5, wherein the server executing the further steps of:

calculating a time interval between an arrival time of the navigation request and an arrival time of the originating physical entry request, and authenticating the navigation request when the time interval satisfies a predetermined duration, otherwise not authenticating the navigation request.

7. The method according to claim 6, wherein the server executing the further step of limiting a single visitor navigation to one or more authorization devices per authenticated physical entry request.

8. The method according to claim 5, wherein the visitor device includes at least one visitor device identifier, and each physical entry request originating therefrom includes at least one visitor device identifier, and the server executing the further the steps of:

storing the at least one visitor device identifier of the visitor device on receipt of the physical entry request; and authenticating the navigation request when the same visitor device sent the authenticated physical entry request and the navigation request, otherwise not authenticating the navigation request.

* * * * *